US012539800B2

(12) United States Patent
JeanCharles

(10) Patent No.: US 12,539,800 B2
(45) Date of Patent: Feb. 3, 2026

(54) REVERSIBLE SWIVEL AND SLIDE VEHICLE TABLE

(71) Applicant: Lisa Marie JeanCharles, Smyrna, GA (US)

(72) Inventor: Lisa Marie JeanCharles, Smyrna, GA (US)

( * ) Notice: Subject to any disclaimer, the term of this patent is extended or adjusted under 35 U.S.C. 154(b) by 194 days.

(21) Appl. No.: 18/228,697

(22) Filed: Aug. 1, 2023

(65) Prior Publication Data

US 2025/0042318 A1 Feb. 6, 2025

(51) Int. Cl.
*B60N 3/00* (2006.01)

(52) U.S. Cl.
CPC .......... *B60N 3/001* (2013.01); *B60N 2205/30* (2013.01)

(58) Field of Classification Search
CPC ........ B60N 3/002; B60N 3/001; A47C 7/624; A47C 7/68; A47C 7/70
USPC ............................ 108/23; 297/155, 173, 151
See application file for complete search history.

(56) References Cited

U.S. PATENT DOCUMENTS

| | | | | |
|---|---|---|---|---|
| 3,156,510 A * | 11/1964 | Hindin | ................. | A47B 67/005 312/223.5 |
| 4,834,449 A * | 5/1989 | Engelman | ................. | A61G 5/10 297/145 |
| 5,035,464 A * | 7/1991 | Spallholtz | ................. | A47C 7/62 403/115 |
| 5,765,911 A * | 6/1998 | Sorenson | ................. | A47C 7/70 297/161 |
| 6,425,631 B1 * | 7/2002 | Lin | ......... | A47B 21/03 297/173 |
| 6,598,934 B1 * | 7/2003 | Anderson | ............. | B60N 3/002 297/145 |
| 7,568,760 B1 * | 8/2009 | Lodes | .................... | A47C 7/624 297/188.21 |
| 8,267,472 B2 * | 9/2012 | Large | ............... | B64D 11/00153 297/145 |
| 8,870,307 B1 * | 10/2014 | Provenzano | ........... | A45D 44/02 312/224 |
| 10,729,239 B2 * | 8/2020 | Murcinova | .......... | A47B 67/005 |
| 10,973,292 B1 * | 4/2021 | Crye | ........................ | B25H 3/02 |
| 11,299,276 B2 * | 4/2022 | Rife | ....................... | B60N 3/002 |
| 2002/0003361 A1 * | 1/2002 | Duerr | ................. | B64D 11/0638 297/147 |
| 2003/0141750 A1 * | 7/2003 | Rossko | .................... | A47C 7/68 297/188.21 |

(Continued)

FOREIGN PATENT DOCUMENTS

JP 09206170 A * 8/1997 ............... A47C 7/70

*Primary Examiner* — Jose V Chen

(57) ABSTRACT

The present invention relates to a Reversible Swivel and Slide Vehicle Table designed for use in vehicles such as trucks and recreational vehicles (RVs). The inventive table includes a table body, a mounting element, a rail with a swivel joint, a sliding latch mechanism, and a set of four extendable legs. The mounting element attaches the table securely to the rear of a front seat. The table's position is adjustable using the rail and swivel joint, and the desired position can be secured with the sliding latch mechanism. The extendable legs provide adjustable height and added stability. The table may also include a vanity set with a mirror, lights, and an extendible tray integrated into the table body. The invention enhances on-the-go convenience for eating and personal item management, offering flexibility, stability, and optimal space utilization within the vehicle.

9 Claims, 5 Drawing Sheets

(56) References Cited

U.S. PATENT DOCUMENTS

| | | | |
|---|---|---|---|
| 2011/0012393 A1* | 1/2011 | Kanthasamy | A47C 17/86 |
| | | | 297/173 |
| 2012/0312198 A1* | 12/2012 | Henderson | B60N 3/002 |
| | | | 108/44 |
| 2013/0285422 A1* | 10/2013 | Tscherwitschke | B64D 11/0624 |
| | | | 297/217.6 |
| 2014/0252811 A1* | 9/2014 | Whalen | B60N 3/002 |
| | | | 297/173 |
| 2014/0300148 A1* | 10/2014 | Frost | B64D 11/0638 |
| | | | 297/173 |
| 2014/0361584 A1* | 12/2014 | Boenigk | A47C 7/62 |
| | | | 297/173 |
| 2018/0072208 A1* | 3/2018 | Howe | B60N 3/001 |
| 2018/0279779 A1* | 10/2018 | Foohey | B60N 3/002 |
| 2022/0095784 A1* | 3/2022 | Yang | A47B 5/02 |
| 2022/0105848 A1* | 4/2022 | Otsuki | B60N 3/002 |
| 2023/0286448 A1* | 9/2023 | Rumph | B60N 3/001 |
| 2024/0239491 A1* | 7/2024 | Cotoner | B64D 11/0638 |

\* cited by examiner

REVERSIBLE SWIVEL AND SLIDE VEHICLE TABLE

FIELD OF INVENTION

The present invention relates generally to the field of vehicle accessories, more specifically to foldout tables that can be installed in vehicles such as trucks or recreational vehicles (RVs). The invention optimizes the space, provides stability, and enhances convenience for drivers and passengers, enabling them to conveniently eat or manage personal items while on the move.

BACKGROUND

Vehicle interiors are often compact and need to be utilized efficiently, especially in smaller vehicles or in situations where the vehicle serves as a mobile living or workspace, such as in semi-trucks or RVs. In such environments, eating or handling personal items while the vehicle is in motion can present a challenge due to the lack of a stable, convenient surface.

Existing vehicle-mounted tables often lack flexibility, stability, and customization, thus failing to meet the diverse needs of drivers and passengers. These tables are typically either permanently fixed or use a single pivot, limiting their position to one side of the vehicle or requiring substantial effort to reposition. Such limitations reduce their usability, making them inconvenient for diverse scenarios and user preferences.

Further, these tables often lack a secure mounting system, resulting in a lack of stability during vehicle motion. Unstable tables can lead to spills or the falling of items, causing potential distractions for the driver and creating a mess within the vehicle.

Additionally, traditional vehicle-mounted tables typically do not offer height adjustability, limiting their functionality for users of different heights or when used in conjunction with seats of varying heights. The lack of height adjustability can lead to uncomfortable posture while eating or working, further reducing the user's comfort and convenience.

Moreover, many current designs lack additional features that could enhance their utility. For instance, integrated storage compartments for personal items or features to facilitate personal grooming (as could be provided in a vanity set) are often missing in current designs, limiting the table's usability.

Hence, there is a need for a vehicle-mounted table that can address these limitations, providing flexibility in positioning, enhanced stability, height adjustability, and additional features for improved utility.

It is within this context that the present invention is provided.

SUMMARY

The present invention is directed towards a versatile vehicle accessory, more specifically, a Reversible Swivel and Slide Vehicle Table, which seeks to address the limitations faced by traditional vehicle-mounted tables. The inventive table optimizes space, provides enhanced stability, and offers a high degree of flexibility and convenience for users in various vehicles, such as trucks and RVs.

In an embodiment of the invention, the table comprises a table body, a mounting element, a rail with a swivel joint and sliding latch mechanism, and a set of four extendable legs. The mounting element securely attaches the table to the rear of the front seat, and the rail and swivel joint allow for a wide range of positional flexibility. The table can be smoothly maneuvered to an optimal location for the driver or passengers using the sliding latch mechanism on the rail. The four legs of the table can be extended or retracted to adjust the table's height and offer additional stability.

In some embodiments, the mounting element includes padding to prevent damage to the vehicle seat. In some embodiments, the table body includes raised edges to prevent items from sliding off during vehicle motion. In some embodiments, the extendable legs include non-slip pads for added stability.

In another embodiment, the table includes a vanity set integrated into the table body, comprising a mirror, a power source, a set of lights positioned around the mirror, and an extendible tray. This version enhances the convenience offered by the table, transforming it into a multi-functional accessory for personal grooming and item storage, apart from its function as a stable surface for eating or working.

In operation, the user can adjust the table's position using the rail and swivel joint, securing it in the desired position with the sliding latch mechanism. The height of the table can be adjusted using the extendable legs, providing an ergonomic surface for various users and scenarios. When not in use, the table can be compactly stored away, minimizing intrusion into the vehicle's interior space.

It is therefore an object of the present invention to provide a vehicle table that offers a high degree of positional flexibility and stability.

Another object of the present invention is to offer a vehicle table with adjustable height, catering to diverse user needs and preferences.

Yet another object of the present invention is to provide a multi-functional vehicle table that includes features for personal grooming and item storage, enhancing the table's utility.

These and other objects, features, and advantages of the present invention will become more apparent upon reading the following specification in conjunction with the accompanying drawing figures.

BRIEF DESCRIPTION OF THE DRAWINGS

Various embodiments of the invention are disclosed in the following detailed description and accompanying drawings.

Figure 1:
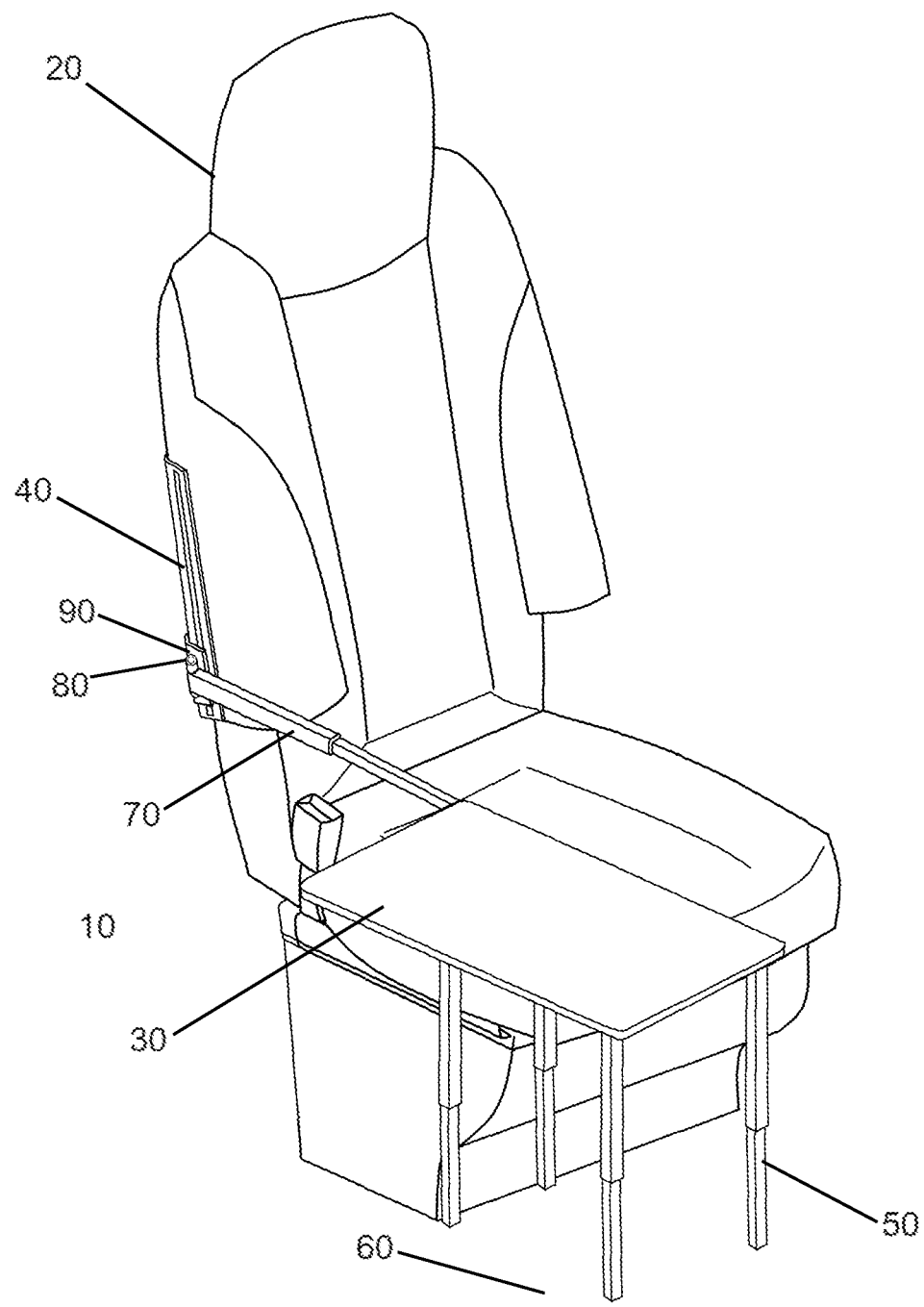
FIG. 1 is an isometric perspective front view of the Reversible Swivel and Slide Vehicle Table of the present invention, showing the table in an extended, unfolded position in front of a vehicle front seat, with its legs extended to touch the vehicle floor.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terminology used herein is for the purpose of describing particular embodiments only and is not intended to be limiting.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

DESCRIPTION OF DRAWINGS

The present invention is directed towards a Reversible Swivel and Slide Vehicle Table. The inventive table is particularly suitable for use in vehicles such as trucks and recreational vehicles (RVs), providing a convenient and stable surface for on-the-go eating and personal item management. The detailed description that follows describes preferred embodiments of the invention, in which the invention may be practiced.

The table body serves as the primary surface for the placement of items. It can be constructed of lightweight, durable materials such as reinforced plastic or a light metal alloy. The edges of the table body are slightly raised to prevent items from sliding off, particularly during vehicle movement. For versions of the table including a vanity set, an internal compartment can be integrated into the table body. This compartment can house a mirror, lights, and additional storage space, and is covered by a sliding or hinged lid.

The mounting element secures the table to the rear of the front seat of the vehicle. It can be designed as a clamp or bracket that wraps around the rear of the seat and is adjustable to accommodate seats of different sizes and shapes. The mounting element can be padded to prevent damage to the seat fabric or structure and includes a connection point to the rail for secure attachment and detachment.

The rail is operatively connected to the mounting element and allows for the positional adjustment of the table relative to the vehicle seat. The rail is constructed of a lightweight, durable material like high-grade aluminum or steel and is designed in a nested manner with multiple segments that can slide into each other. One end of the rail includes a swivel joint for connection to the table body, while the other end has a locking mechanism for secure attachment to the mounting element.

The swivel joint is integrated with the rail and allows for the rotation of the table body around the vehicle seat. This joint provides 360-degree rotation, facilitating the positioning of the table as needed.

The sliding latch mechanism is located on the rail and is used to secure the table in the desired position. It can be designed as a lever, button, or pin that interacts with the rail. When engaged, it creates friction against the rail segment or physically obstructs its movement, securing the table in place.

The table includes a set of four extendable legs that attach to the bottom surface of the table body. These legs provide height adjustability and additional stability. They can be retractable using a telescopic, foldable, or other retractable mechanism. When extended, the legs reach the cab floor. When not in use, the legs can be fully retracted and folded against the underside of the table body for compact storage.

In use, the table is attached to the rear of the front seat using the mounting element. The rail and swivel joint allow for the positioning of the table in front of the driver or at the rear of the front seat. The sliding latch mechanism can be engaged to secure the table in the desired position. The extendable legs can be used to adjust the height of the table and provide additional stability. When not in use, the table can be compactly stored, taking up minimal space in the vehicle's interior.

The Reversible Swivel and Slide Vehicle Table of the present invention, indicated generally by the reference numeral 10, is depicted in three different configurations across FIGS. 1 to 4, as mounted on a vehicle front seat 20.

The vehicle table 10 comprises several integral components: a table body 30, a mounting element 40, a rail 70, a swivel joint 80, a sliding latch mechanism 90, and a set of four extendable legs 50. The table body 30 is the primary flat surface for placing items, making it a critical part of the assembly. The mounting element 40, designed to wrap around the rear of the vehicle front seat 20, secures the table 10 in place, ensuring a stable and reliable connection that can withstand the vehicle's movement and the weight of items placed on the table body 30. The rail 70, which is operatively connected to the mounting element 40, allows for the adjustment of the table body 30's position relative to the vehicle seat 20. The swivel joint 80, integrated within the rail 70, facilitates rotation of the table body 30 around the vehicle seat 20, allowing users to easily position the table 10 for their convenience.

FIG. 1 presents the vehicle table 10 in an extended, unfolded position in front of the vehicle front seat 20. In this configuration, the sliding latch mechanism 90, which is strategically located on the rail 70, is engaged. This engagement effectively secures the table body 30 in the desired position, preventing unwanted movement during use. Additionally, the extendable legs 50 are shown in an extended position, making contact with the vehicle floor 60 to provide added stability to the table 10. These legs 50 reduce the likelihood of the table 10 tipping or shifting while the vehicle is in motion.

Figure 2:
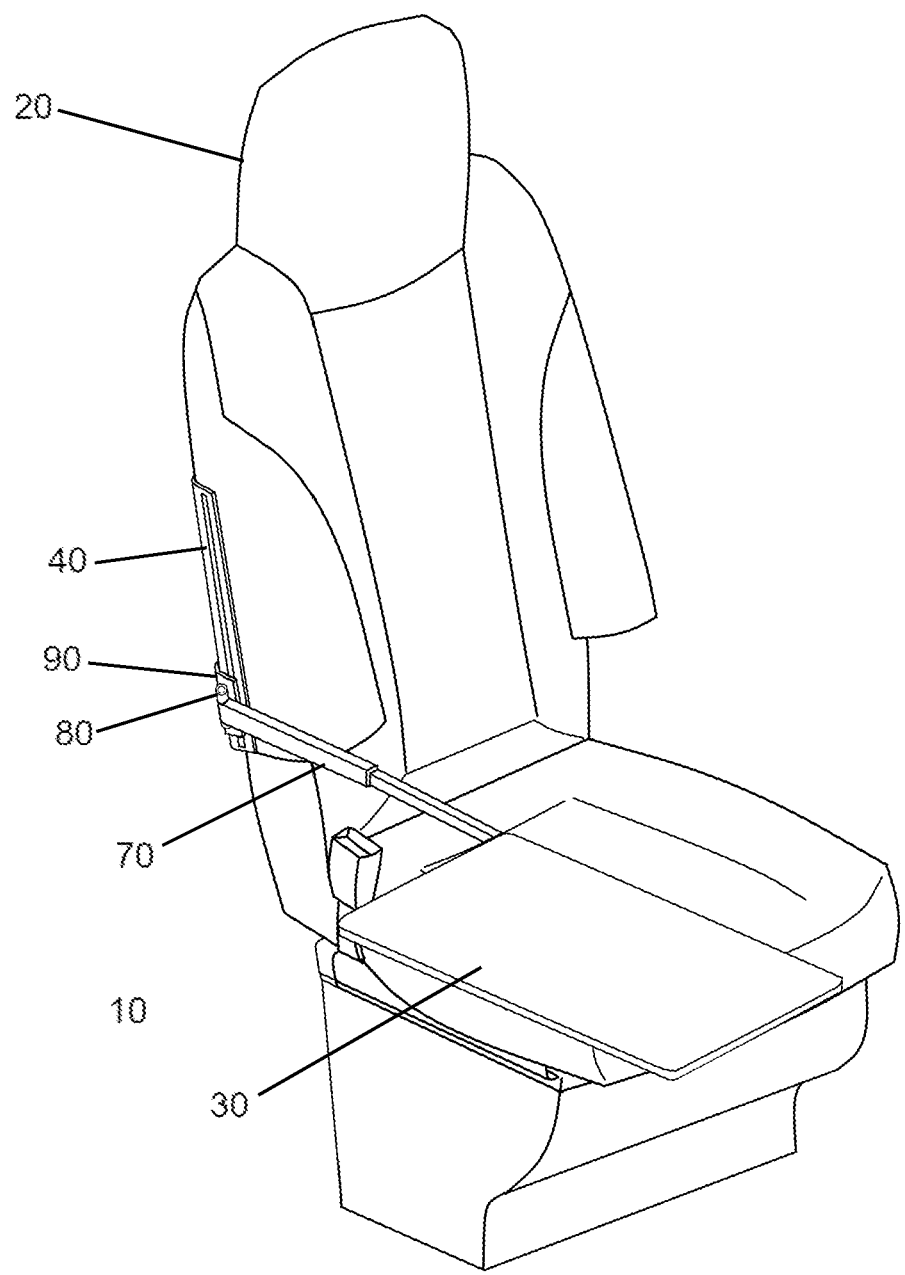
FIG. 2 depicts an isometric perspective front view of the invention as mounted on a vehicle front seat, with the table in an extended, unfolded position in front of the seat, but with its legs retracted.

FIG. 2 shows another configuration of the vehicle table 10 where the table body 30 is in an extended, unfolded position in front of the vehicle front seat 20, similar to FIG. 1. However, in this depiction, the extendable legs 50 are illustrated in a retracted state. This configuration underlines the table's versatility, highlighting its ability to adjust according to the user's preference and specific vehicle conditions, without compromising the stability and usability of the table 10.

Figure 3:
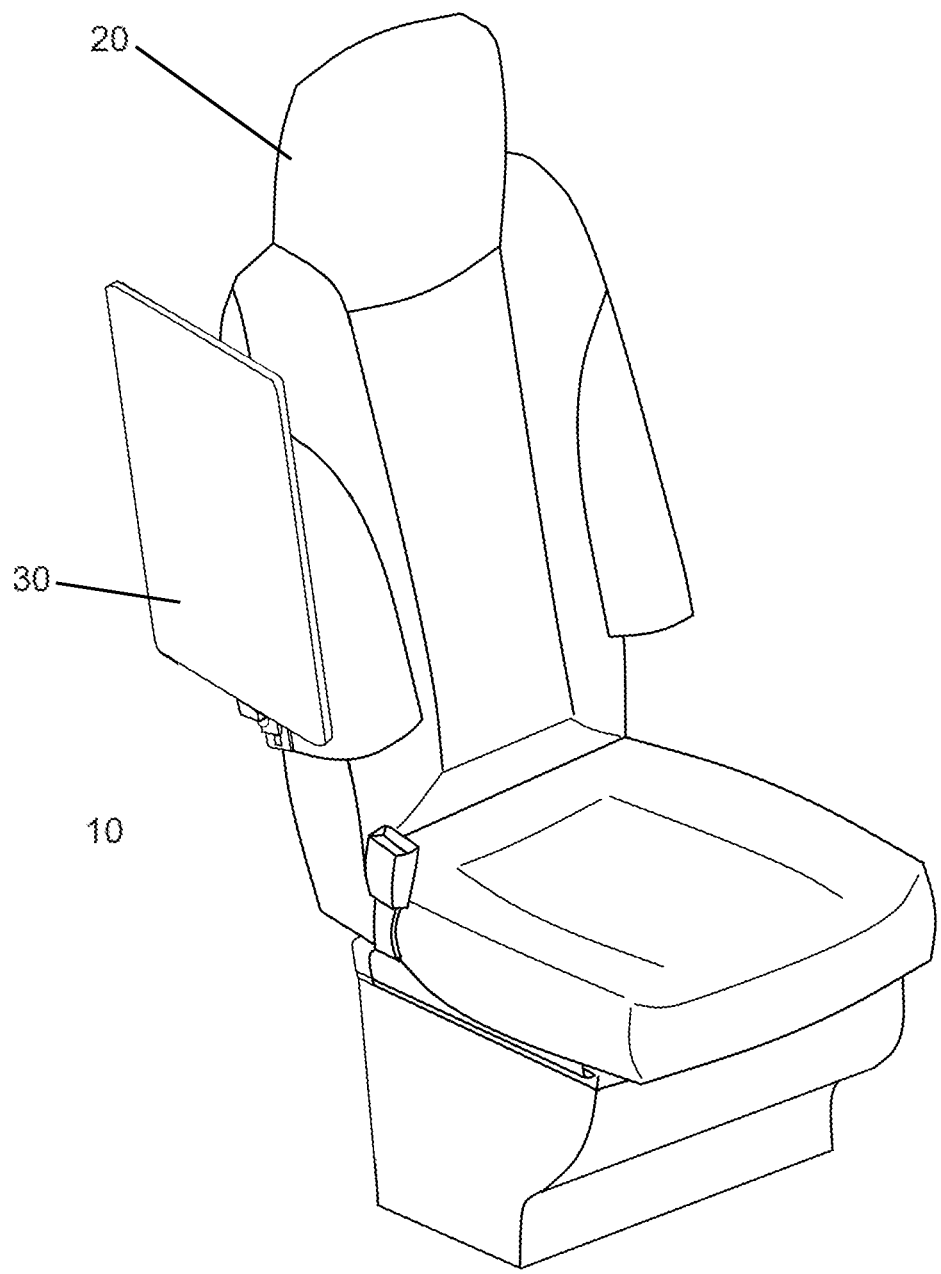
FIG. 3 shows an isometric perspective front view of the invention attached to a vehicle front seat, with the table swivelled and folded to rest vertically next to the driver's seat.

In FIG. 3, the vehicle table 10 is shown in a space-saving configuration. Here, the table body 30 has been swivelled and folded to rest vertically next to the driver's seat, taking up minimal space in the vehicle's interior. Despite the repositioning of the table 10, the mounting element 40 continues to maintain a stable connection with the seat 20. The sliding latch mechanism 90 secures the table body 30 in its vertical position adjacent to the seat 20. Meanwhile, the extendable legs 50 remain fully retracted, tucked neatly against the underside of the table body 30 for efficient, compact storage. This configuration demonstrates the invention's ability to adapt to various needs, minimizing its footprint within the vehicle's interior when not in use, while remaining easily accessible for deployment.

Figure 4:
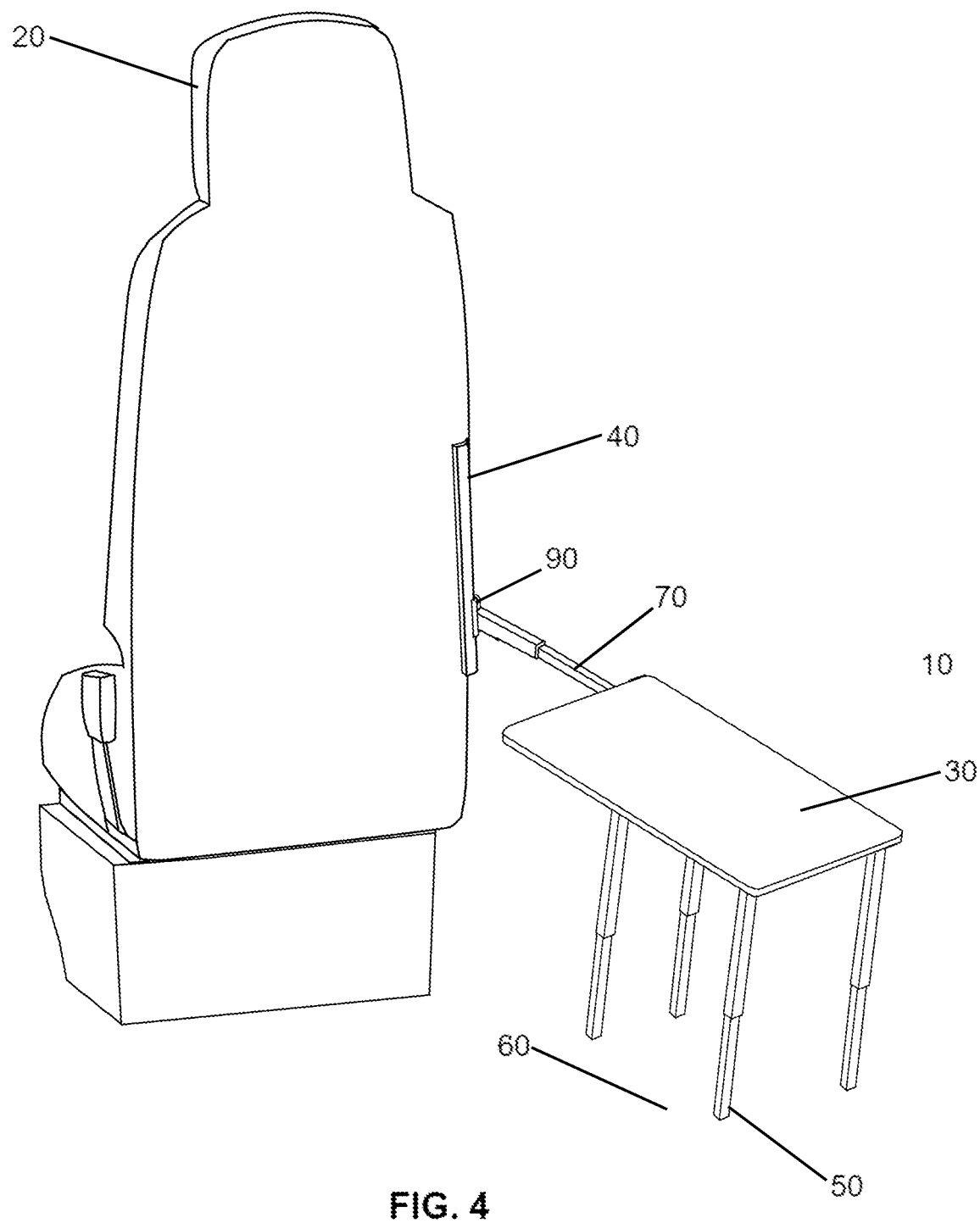
FIG. 4 illustrates a perspective isometric view from the rear of the invention, where the table is unfolded on the reverse side of the seat, with legs extended behind the seat, thus enabling use by passengers seated in the rear.

FIG. 4 depicts a perspective isometric view of the Reversible Swivel and Slide Vehicle Table 10 and the vehicle front seat 20 from the rear. In this configuration, the table 10 is unfolded on the reverse side, sitting with its legs 50 extended behind the vehicle seat 20 to which it is mounted. This positioning enables passengers located in the rear to make use of the table 10.

In this rear perspective, the mounting element 40 can be seen attached to the rear of the vehicle front seat 20. Despite being on the opposite side of the seat 20 compared to FIGS. 1-3, the mounting element 40 continues to provide a secure and stable connection for the table 10.

The rail 70, operatively connected to the mounting element 40, has been adjusted to extend the table body 30 to the rear of the vehicle seat 20. The swivel joint 80, an integral part of the rail 70, has been utilized to rotate the table body 30 around the seat 20, positioning the table conveniently for rear seat passengers.

The sliding latch mechanism 90, situated on the rail 70, has been engaged to secure the table body 30 in this unfolded position behind the vehicle front seat 20. This mechanism ensures the stability of the table 10, keeping it firmly in place to accommodate the needs of the rear passengers.

In another embodiment of the invention, the table body includes a vanity set. This vanity set consists of a mirror, a power source, a set of lights positioned around the mirror, and an extendable tray. The vanity set can be housed in an internal compartment in the table body and can rotate 180 degrees for versatile usage.

Figure 5:
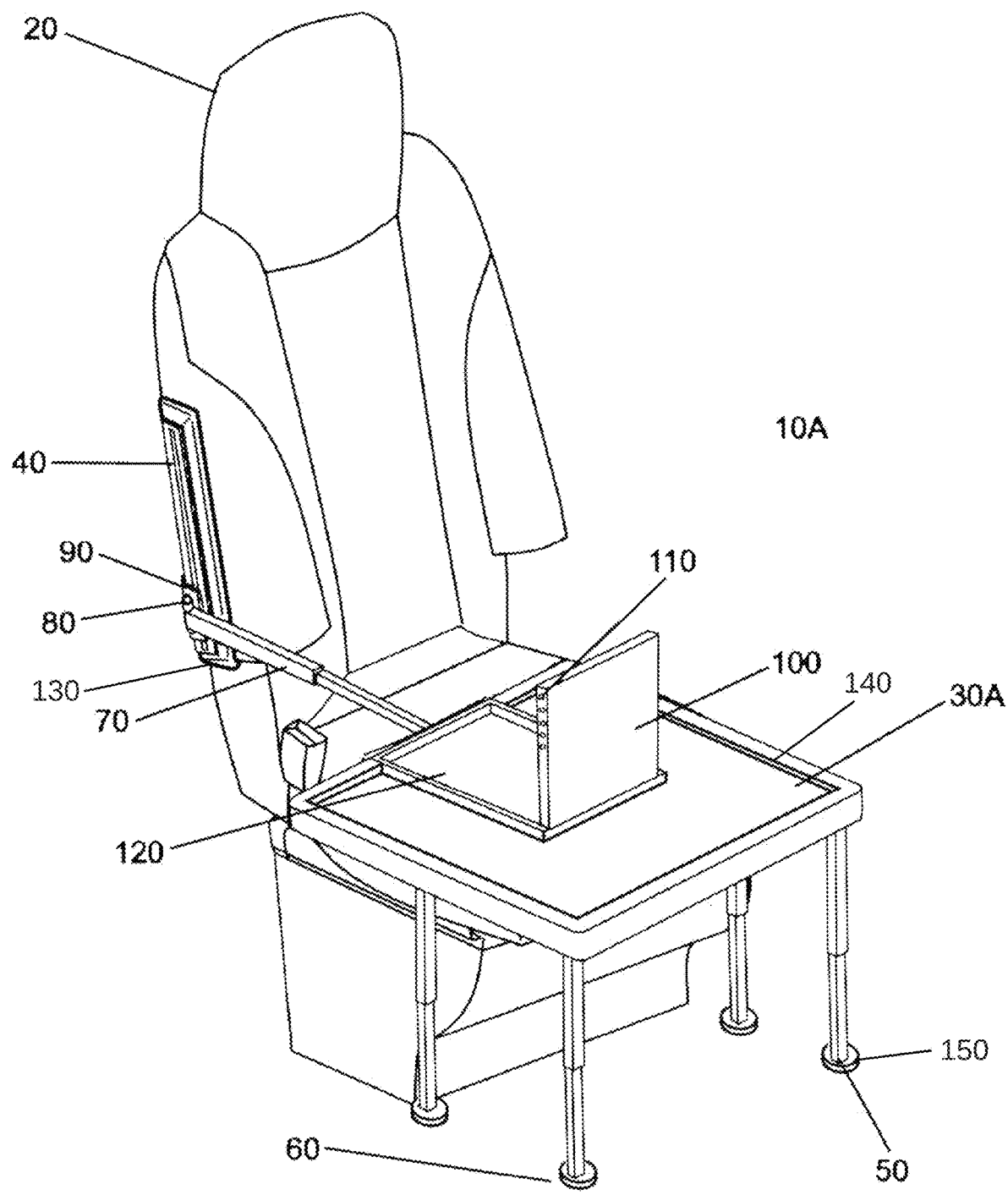
FIG. 5 demonstrates an isometric perspective view of another embodiment of the table with an integrated vanity set, extended in front of the seat with the vanity compartment unfolded to display a mirror, a set of lights, and a compartment for holding vanity items.

FIG. 5 illustrates an isometric perspective view of another embodiment of the Reversible Swivel and Slide Vehicle Table, referenced as 10A, which incorporates an integrated vanity set. In this depiction, the table 10A is shown in a position similar to that of FIG. 1, extended in front of the vehicle front seat 20, but with an additional vanity compartment folded open to reveal a mirror 100, a set of lights 110, and a compartment 120 for holding vanity items.

The modified table body 30A in this embodiment is thicker than that shown in previous figures to accommodate the integrated vanity set. Despite this added thickness, the table body 30A remains a versatile surface for placing items, its extended position in front of the vehicle front seat 20 offering the same convenience and functionality as the prior versions.

The mounting element 40, rail 70, swivel joint 80, sliding latch mechanism 90, and the set of four extendable legs 50 all function as previously described, providing the same secure mounting, positional adjustment, rotation, secure latch, and stability features.

What differentiates this embodiment is the inclusion of an internal vanity set within the table body 30A. This vanity set includes a mirror 100, a set of lights 110, and a vanity compartment 120. When the vanity compartment is not in use, it can be folded closed, integrating seamlessly with the rest of the table body 30A. Upon being unfolded, the vanity compartment reveals the mirror 100 and a set of lights 110, which can provide illumination as needed. A dedicated vanity compartment 120 is provided for the secure storage of personal vanity items.

As shown in FIG. 5, the mounting element 90 may include padding 130 to prevent damage to the vehicle seat fabric or structure. The table body 30A includes raised edges 140 around its perimeter to prevent items from sliding off during vehicle movement. Additionally, the extendable legs 50 include non-slip pads 150 at their distal ends for enhanced stability when extended to contact the vehicle floor 60.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the table have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A reversible swivel and slide vehicle table, comprising:
   a. a table body providing a surface for placing items;
   b. a mounting element configured for securing said table body to the rear of a vehicle seat;
   c. a rail, operatively connected to said mounting element, configured for adjusting the position of said table body relative to a vehicle seat when said mounting element is secured thereto;
   d. a swivel joint, integrated with said rail, configured for facilitating rotation of said table body around the vehicle seat when said mounting element is secured thereto; and
   e. a set of four extendable legs, attached to said table body, for adjusting the height of said table body and providing additional stability.

2. The vehicle table of claim 1, further comprising a sliding latch mechanism configured to secure said rail in a desired position.

3. The vehicle table of claim 1, wherein said mounting element includes padding to prevent damage to the vehicle seat.

4. The vehicle table of claim 1, wherein said rail is constructed of a lightweight, durable material.

5. The vehicle table of claim 1, wherein said table body includes raised edges to prevent items from sliding off during vehicle motion.

6. The vehicle table of claim 1, wherein said extendable legs are retractable for efficient storage of said table body when not in use.

7. The vehicle table of claim 1, further comprising a vanity set integrated into said table body.

8. The vehicle table of claim 1, wherein said extendable legs include non-slip pads for added stability.

9. The vehicle table of claim 1, wherein said rail, swivel joint, and set of four extendable legs provide a range of positional flexibility and stability for said table body in front of the driver or at the rear of the vehicle seat.

* * * * *